June 5, 1962 T. R. BOYD 3,037,542
STUD ASSEMBLY HAVING GROMMET WITH GROMMET JACKING SPRING
Filed Feb. 5, 1959 3 Sheets-Sheet 1
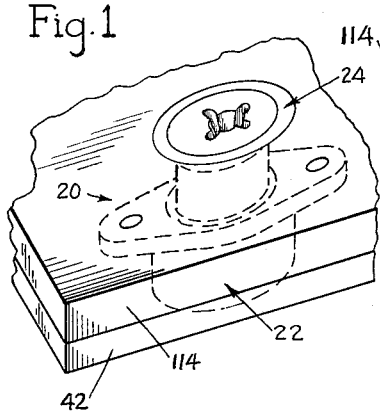
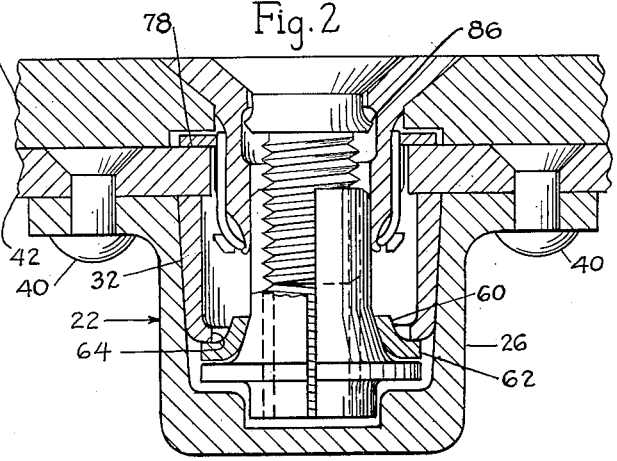
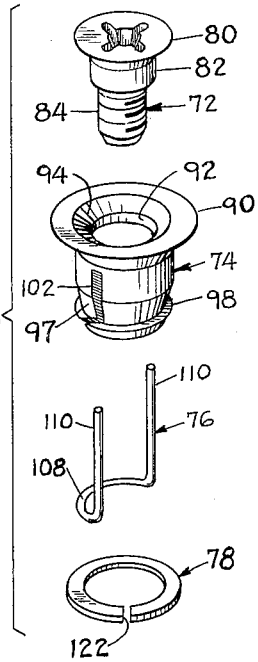
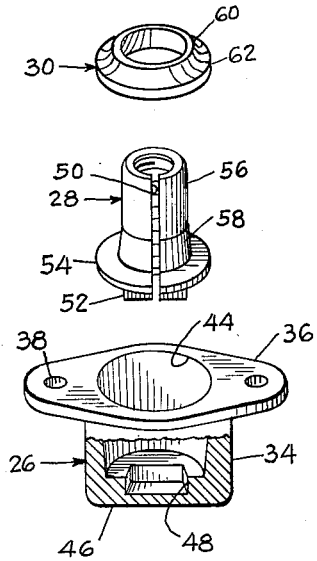
INVENTOR.
Thomas R. Boyd
BY
Robert W. Beart
HIS ATTORNEY.

June 5, 1962 T. R. BOYD 3,037,542
STUD ASSEMBLY HAVING GROMMET WITH GROMMET JACKING SPRING
Filed Feb. 5, 1959 3 Sheets-Sheet 2
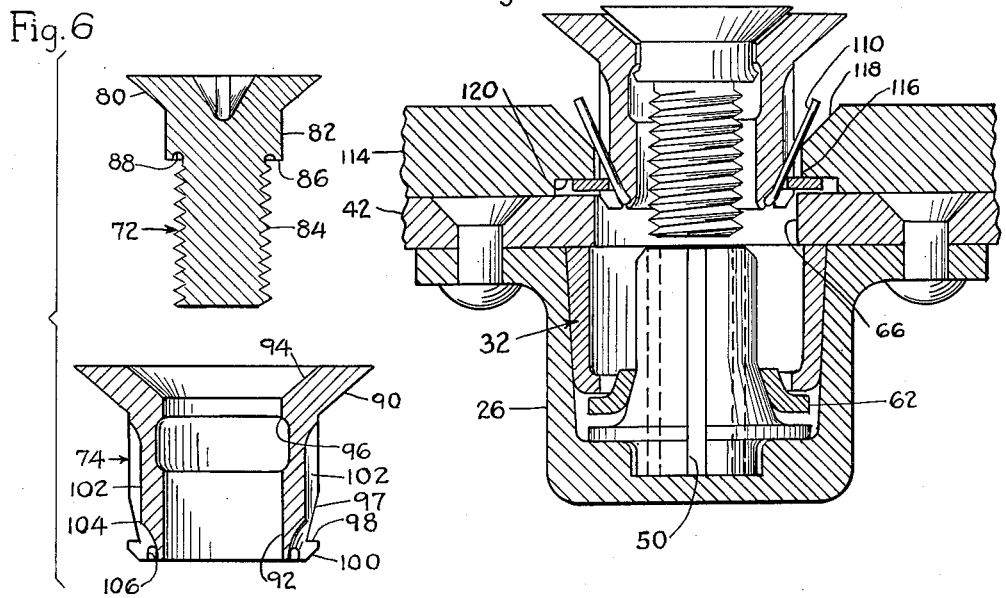
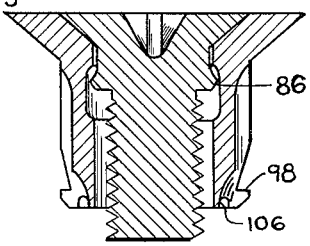
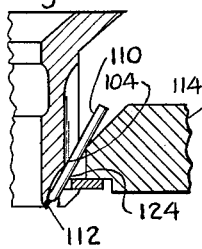
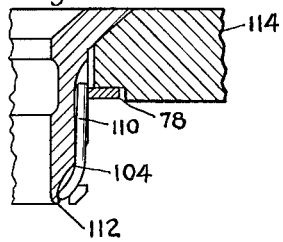
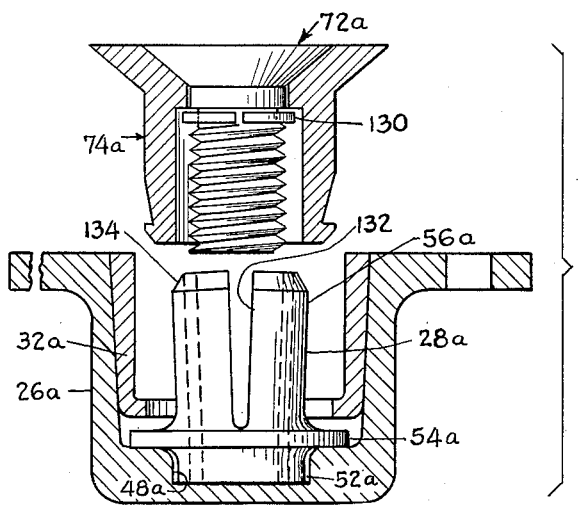
INVENTOR.
Thomas R. Boyd
BY
Robert W. Beart
HIS ATTORNEY.

June 5, 1962 T. R. BOYD 3,037,542
STUD ASSEMBLY HAVING GROMMET WITH GROMMET JACKING SPRING
Filed Feb. 5, 1959 3 Sheets-Sheet 3
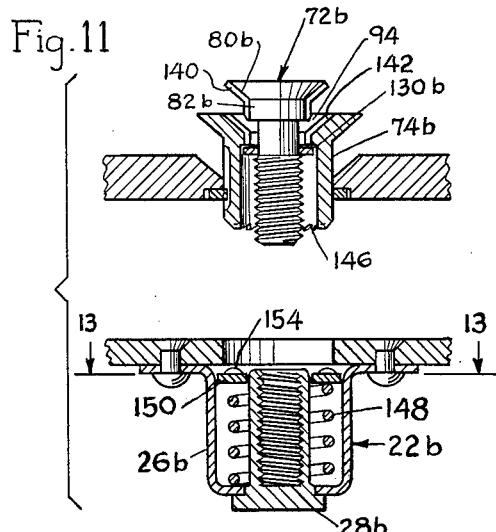
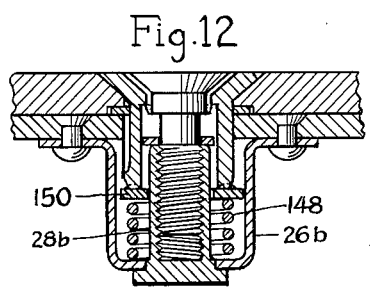
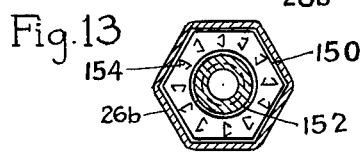
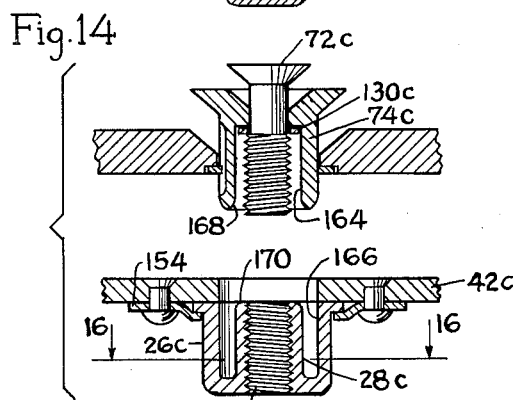
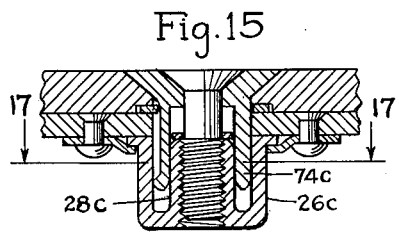
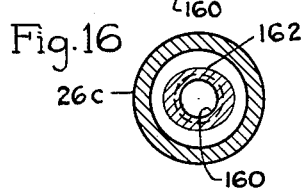
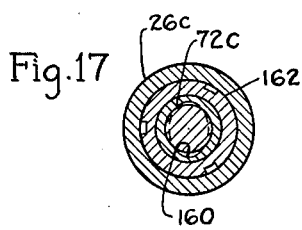
INVENTOR.
*Thomas R. Boyd*
BY
*Robert W. Beart*
HIS ATTORNEY United States Patent Office 3,037,542
Patented June 5, 1962

3,037,542
STUD ASSEMBLY HAVING GROMMET WITH
GROMMET JACKING SPRING
Thomas R. Boyd, Rolling Hills Estates, Calif., assignor to Illinois Tool Works, Inc., Chicago, Ill., a corporation of Delaware
Filed Feb. 5, 1959, Ser. No. 791,464
5 Claims. (Cl. 151—21)

The present invention relates to novel fastener devices, and more particularly to quickly operable fastener devices especially adapted releasably to secure a pair of panels or workpieces together, which panels may be, for example, panel parts of aircraft.

As is well known, the aircraft industry, to facilitate weight reduction, has found it desirable to utilize panel members as part of the load supporting structure. This has resulted in the development of fastening devices, which are known in the art, which permit panel members to assume stress loads with respect to frame sections in aircraft.

Certain difficulties have arisen in the use of these fasteners. A primary problem develops in the use of these fasteners in panel sections having a very limited radius of curvature. The fasteners to withstand the high shear loads have been increased in external dimensions. Such panels have been "hung up" when the element in one panel projects below said panel into the aperture of the adjacent or supporting panel whereby it becomes impossible to remove the outer panel from the structure as a whole. Ways have been sought to eliminate this "hanging up" of panel members through the development of a better fastener. This has resulted in many fasteners which are complex in nature, having many parts, which because of their precise nature will sometimes get out of adjustment or have too short a life expectancy for satisfactory use in aircraft.

It is an important object of the present invention to provide a novel quickly operable fastening device which will overcome many of the difficulties encountered in fasteners disclosed heretofore.

Another object of the present invention is to provide a high shear fastener which has a minimum of projecting parts extending below the outer panel.

Still another object of the present invention is to provide a novel quickly operable fastener which is more efficient in operation and which is relatively rugged and easy to manufacture.

A further object of the present invention is to provide a novel, quickly operable fastening device including a stud assembly and a grommet assembly which permits the workpieces to be assembled together relatively easily and which is capable of withstanding large shear loads.

A more specific object of this invention is to provide a stud assembly which will move itself axially out of position relative to the receptacle assembly and to the work panel through which it projects as an incident of unfastening. A further specific object is to provide means for retaining this assembly in ejected position relative to the panel member.

Another object is to provide a fastener of the type contemplated having a simple novel locking means which is re-usable a great number of times without injury to itself or the fastening means associated therewith.

Other objects and advantages of the present invention will become apparent in the following description in the accompanying drawings wherein:

FIGURE 1 is a perspective view illustrating the elements of a quickly operable fastening device embodying the principles of this invention in applied position;

FIGURE 2 is a partial cross-sectional view showing the elements of the fastening device of FIGURE 1;

FIGURE 3 is an exploded perspective view of the elements found in the receptacle assembly;

FIGURE 4 is an exploded perspective view of the elements utilized in the stud assembly;

FIGURE 5 is a partial cross-sectional view of the device of FIGURE 1 shown in retracted position;

FIGURE 6 is an exploded cross-sectional view of the stud and grommet prior to assembly;

FIGURE 7 is a cross-sectional view of the stud and grommet in assembled relationship;

FIGURE 8 is a fragmentary cross-sectional view showing the ejection spring in ejected position;

FIGURE 9 is a showing of the ejection spring in installed position;

FIGURE 10 is a partial cross-sectional view showing a modified form of the present invention;

FIGURE 11 is a cross-sectional view showing another modified form of the present invention in ejected position;

FIGURE 12 is a cross-sectional view of the modification shown in FIGURE 11 is assembled position;

FIGURE 13 is a plan view of the ratchet locking plate as taken along line 13—13 in FIGURE 11;

FIGURE 14 is a cross-sectional view showing still another modified structure embodying the principles of the present invention and shown in separated position;

FIGURE 15 is a cross-sectional view of the device shown in FIGURE 14 in assembled position;

FIGURE 16 is a cross-sectional view taken along line 16—16 in FIGURE 14; and

FIGURE 17 is a cross-sectional view taken along line 17—17 in FIGURE 15.

Referring now more specifically to the drawings wherein like parts are designated by the same numerals throughout the various figures, a fastening device 20 embodying the principles of this invention is shown in FIGURES 1–9. In general, the fastening device 20 includes a receptacle assembly 22 and a stud assembly 24.

The receptacle assembly 22 includes a receptacle 26, a nut member 28, a locking ring 30 and a retainer member 32. The receptacle 26 includes a cup-like portion 34 open at one end. Adjacent the open end there is located a laterally extending flange 36 having apertures 38 for the acceptance of suitable fastening means, in this instance rivets 40, for the attachment of the receptacle to an inner work panel 42. The inner wall 44 of receptacle 34 is preferably slightly tapered and converges toward the closed end. The base 46 of the receptacle is provided on its inner surface with a non-circular recess or cavity 48 for purposes set forth hereinafter.

Internally threaded nut member 28 is generally tubular in shape and split throughout its length by slot 50. The lower end 52 of the nut member 28 is non-circular in configuration and complementary in shape to the recess 48 and is smaller in its transverse dimensions than recess 48 so that it is capable of lateral movement or float. A flange 54 is spaced intermediate the length of the nut member in the vicinity of the lower end 52. The upper portion 56 of the nut 28 is generally cylindrical in shape and of lesser diameter than flange 54. It is joined to the flange portion by frusto-conical section 58 which blends into the cylindrical portion 56 as well as the flange 54 with the major diameter of said section 58 positioned adjacent flange 54. A slight chamfer is formed on the upper end of portion 56 to facilitate insertion of the nut in the grommet.

Locking ring 30 is continuous throughout its extent and includes a frusto-conical section 60 joined to a laterally extending flange 62. The internal bore of ring 30 is substantially complementary to the upper portion of frusto-conical section 58. When the nut is positioned in the recess of the receptacle, the ring 30 is placed over the cylindrical end of nut 28 into contact with the frusto-conical section 58.

To retain the nut and locking ring in the receptacle, suitable means, such as retainer member 32 is provided. Member 32 is cup-like in nature with its outer wall slightly tapered to generally conform to the inner wall 44 of the receptacle. The lower end of retainer 32 is provided with an aperture 64 of such size that it will accept the upper end of nut 28 as well as the frusto-conical portion of ring 30 when telescopically associated therewith. The retainer 32 is pressfit within the receptacle 26 or otherwise suitably fastened thereto so as to prevent axial movement relative to said receptacle. It should be noted in FIGURE 5 that the axial length of retainer member 32 is such that its undersurface is sufficiently spaced from the bottom 46 so as to permit axial movement of locking ring 30 and nut 28 relative to the bottom 46 of the receptacle and the under side of retainer 32 for purposes set forth hereinafter. To assure positive retention of the retainer, locking ring and nut within the receptacle, the dimension of aperture 66 in workpiece 42 is controlled so that the upper edge of retainer 32 will bear against the undersurface of workpiece 42 in the event retrograde movement should occur in the retainer 32, thus providing a safety factor in this device.

The stud assembly 24 includes a screw member 72, a grommet 74, a spring ejection retainer 76 and a retaining ring 78. The screw member 72 includes a conical head 80 with suitable driving means in the face thereof, a smooth shank portion 82 adjacent said head section and a threaded shank portion 84 having a smaller diameter than portion 82 forming a shoulder 86 at the juncture of said two shank portions. The surface of shoulder 86 is relieved by an annular groove 88 for purposes best set forth hereinafter.

The generally cylindrical grommet 74 includes a frusto-conical head 90, a bore 92 extending axially through the grommet and having a countersunk portion 94 at the head end to accept the complementary head 80 of screw 72. Intermediate its length, bore 92 is relieved to form shoulder 96. The outer surface of grommet 74 is tapered in frusto-conical section 97 adjacent its free end stopping short of said free end to form shelf or shoulder 98 and to ease insertion of the grommet in the workpiece, a chamfer 100 is provided at its free end.

On opposite sides of the grommet there are provided a plurality of slots 102 extending from the free end of the grommet to a point adjacent the head end. They are of increased radial depth adjacent said free end so as to provide a fulcrum point 104 in each slot. An annular groove 106 is fabricated in the free end of the grommet and communicates with each of the slots 102 for purposes set forth hereinafter.

As best seen in FIGURES 6 and 7, the screw member 72 is telescoped into the grommet 74 until the head 80 rests on the counterbore 94. A suitable tool, not shown, is inserted within the grommet into contact with shoulder 86. An axial force is applied to the tool which axially and radially deforms relieved shoulder 86 so that it expands laterally into the cavity formed in the counterbore of the grommet. Thus, the screw 72 is axially captivated within the grommet by means of its head section 80 and the shoulder 86 cooperating with the counterbore 94 and grommet shoulder 96 respectively but allowing relative rotation between the parts.

Referring now to FIGURES 4, 7 and 8, the ejection retainer 76 includes a semi-cylindrical or U-shaped portion 108 and a pair of spring arms 110. Said arms 110 are extensions of the free ends of U-shaped portion 108 and initially extend generally normal to the plane in which U-shaped portion 108 lies. The U-shaped portion 108 is positioned within the annular groove 106 with the arms 110 lying within slots 102. The inner edge of slot 106 is spun over as at 112 to capture ejection retainer 76 in groove 106. As can best be seen in FIGURES 5 and 8, the arms 110 are torsionally forced laterally because of contact with fulcrum 104.

The outer panel 114 is suitably prepared with an aperture 116 having approximately the same diameter as aperture 66 in the lower panel. Aperture 116 is countersunk at its outer extremity as at 118 complementary to head 90 of the grommet and a counterbore 120 is provided on its undersurface for purposes set forth hereinafter.

The stud assembly 24 is inserted through aperture 116 and resilient retainer ring 78 is then expanded over the free end of grommet 74 past shelf 98. Retainer ring 78 is split as at 122 and is adapted for resilient expansion and contraction. It is capable of axial travel along the outer surface of the grommet between the limits of the frusto-conical head 90 and the shoulder 98. In the generally cylindrical upper portion, it is in expanded condition, whereas as it rides down the frusto-conically relieved portion 97, it will contract until it is approximately back to normal condition when resting on shoulder 98. As can best be seen in FIGURES 8 and 9, the movement of the retaining ring 78 to the upper extremities of the grommet forces the arms 110 to be completely enclosed within the slots 102. When the ring approaches its lower limit, its resilient contraction rides down the frusto-conical portion of the grommet and exerts a force against the lower portion of arm 110 as at 124 cooperating with fulcrum 104 to vigorously force arm 110 radially outwardly.

In the operation of this device, as best seen in FIGURES 2 and 5, an axial force applied by a screw driver to the driving means of the screw 72 forces the stud assembly downwardly until the screw engages the threads of nut 28. Rotation of the screw draws the stud assembly downwardly within the receptacle. The nut member is drawn upwardly, in the drawings, relative to the receptacle and a continued rotative force applied to screw 72 draws the nut 28 upwardly within the grommet and brings flange 62 of the locking ring into engagement with the bottom of retainer 32. The increased diameter of the lower portion of frusto-conical section 58 is forced radially inwardly to conform with the inner shape of frusto-conical section 60 in the locking ring 30. This results in a radial contraction of the entire nut 28 and a closing of the slot 50 whereby a frictional locking force is exerted on the threaded shank 84 of the screw member. As can be seen in FIGURE 2, the retainer ring 78 acting against inner sheet 42 has assumed a position adjacent the head of grommet 74 and has radially collapsed the arms 110 to the captured position shown in FIGURE 9.

To unfasten the panels 42 and 114, the screw 72 is rotated in the reverse direction forcing the nut 28 downwardly against the base of the receptacle 26 with a resultant force of screw shoulder 86 acting upwardly against shoulder 96 in the grommet. The grommet is thus ejected from within the receptacle 24. Retainer ring 78 bearing against counterbore 120 is moved downwardly relative to the grommet and radially inwardly along the lower frusto-conical relief until it comes to rest on shoulder 98 thereby limiting further withdrawal of the grommet from the panel. As was indicated before, this motion results in a radially outwardly movement of the spring arms 110 which contact the edge of the countersunk aperture 118 and retain the stud assembly in ejected position.

A modification to this invention is shown in FIGURE 10 wherein similar numerals are utilized to designate similar parts with the addition of the suffix "*a*." The screw 72*a* in this instance is retained in the grommet 74*a* by means of a retaining ring 130 positioned on an unthreaded portion of the shank adjacent the shouldered head. The receptacle assembly 22*a* is substantially identical to the first embodiment disclosed with a variation of locking means in the nut element 28*a*. Nut element 28*a* is substantially cylindrical throughout its length and has a flange 54*a* positioned intermediate its length. It is bored and tapped with an internal thread. A slot 132 traverses opposite walls of the nut and extends from its upper end to a point adjacent the flange 54a. The opposed segments of the nut are deformed radially outwardly at their upper ends to provide a reverse taper on the outer surface of the nut 28a. A lead in chamfer 134 is created at the upper end of the nut to facilitate its entry into grommet 74a. The nut is preferably hardened to make the segments more resilient. The lower end 52a is non-circular in cross-section and is seated in recess 48a in the base of the receptacle. A retaining means 32a is telescoped over the nut 28a and is suitably secured relative to the receptacle in the manner described in the first embodiment.

The axial telescoping of the modified stud and receptacle assemblies results in a forcible radial contraction of the cylindrical portion 56a of this nut member by the capturing of the nut within the inner wall of grommet 74a.

A further embodiment of this invention is shown in FIGURES 11 and 12 wherein similar parts are designated by similar numerals bearing the suffix "b." The stud assembly is comprised of a screw 72b axially retained relative to grommet 74b by means of a retaining ring 130b. A plurality of axially extending ribs 140 are provided on the under side of the conical head 80b and along the axial extent of the smooth shank portion 82b. A plurality of grooves 142, at least equal in number to ribs 140, are located in the bore and countersunk portion 94b of the grommet 74b whereby, upon axial telescopic association of these two parts, the ribs 140 will mate with grooves 142 to permit the screw 72b and grommet 74b to rotate as a unit.

Located at the free end of the grommet 74b are a plurality of ratchet teeth 146 for purposes set forth hereinafter.

The receptacle assembly 22b includes a receptacle 26b having a tubular nut member 28b non-rotatably associated therewith and extending upwardly within the receptacle. A spring 148 is positioned around the nut 28b and extends from the base of the receptacle 26b to a point of termination just short of the open end of the receptacle. In this instance, the spring is helical. A ratchet plate 150 having a central aperture 152 is telescopically associated with nut 28b. It rests atop spring 148 and is urged upwardly by said spring. It is non-rotative relative to receptacle 26b and said non-rotatability is accomplished in the present instance by a non-circular or polygonal complimental shape between the outer edge of ratchet plate 150 and the interior of receptacle 26b. It should be noted, however, that other suitable means, not shown, can be employed, such as tabs and slots or other rotation preventing means coacting between the plate 150 and receptacle 26b. In this embodiment, the axial telescoping of the stud and receptacle assemblies results in an acceptance of the nut 28b within the grommet 74b and an axial depression of the spring-urged ratchet plate 150. The rotation of screw 72b results in a rotation of the grommet 74b with the teeth 146 engaging the protuberances 154 on the plate 150. Thus, unintentional retrograde rotative motion of the stud assembly relative to the receptacle is prevented by the interengagement of said teeth 146 and 154 respectively.

A further embodiment of the present invention is found in the device best seen in FIGURES 14 through 17 wherein similar parts bear similar numerals with the addition of the suffix "c." This device utilizes a screw 72c captured in substantially cylindrical grommet 74c by means of ring 130c.

The receptacle assembly includes a receptacle 26c having a resilient distortable nut element 28c non-rotatably associated therewith and suitable means, such as a retainer 154 for non-rotatably retaining the receptacle relative to a work panel 42c as is well known in the art. The nut 28c differs from the other embodiments in that it is continuous and is provided with a cylindrical threaded bore 160 and an elliptical exterior surface 162 substantially throughout its length. The inner diameter of the counterbore 164 in the grommet 74c is controlled so that said counterbore 164 is less than the major diameter of the elliptical shape 162 but greater than the minor diameter of said elliptical shape. Similarly, the diameter of the inner wall 166 of the receptacle is substantially the same as the outer diameter of grommet 74c. Both the grommet and the nut are chamfered at their free extremities, as indicated at 168 and 170 respectively. The screw 72c projects a substantial distance below the grommet 74c and substantially engages the threaded cylindrical bore prior to movement of the nut into the void between the screw and grommet counterbore 164. Further axial telescopic association of the two assemblies results in a resilient radial deformation of nut 28c wherein the grommet forces the nut 28c to approach circularity on its outer surface 162. This produces a temporary deformation of the cylindrical bore 160 to a noncircular form, exaggerated for clarity in the drawing, thereby frictionally locking the device against the male threads of screw 72c. Controlling the diametric tolerances of the inner wall of receptacle 26c assists the grommet 74c by secondary support in the maintenance of its circularity. Axial removal of the grommet permits the nut to return to its original conformation for re-use and locking.

In accordance with the present invention, the particular arrangements of locking means in the various embodiments of receptacle assembly 22 or the retainer means in the stud assembly 24 may be incorporated or interchanged where compatible in any of the embodiments shown.

From the above description, it is seen that the present invention has provided a novel, quickly operable fastening device whereby workpieces, such as panel members in aircraft may be easily and repeatedly assembled and disassembled without injury thereto. In addition, it is seen that the present invention has provided a novel fastening device which is of relatively economical and rugged construction and which is formed so that both the work panels and the fastening device are protected against injury which may result from the projection of the stud assembly below the outer panel during the removal of said outer panel from the primary structure.

While the preferred embodiments of the present invention have been shown and described herein, it is obvious that many structural details may be changed without deterring from the spirit and scope of the appended claims.

The invention is claimed as follows:

1. A high shear fastener comprising a stud assembly and a receptacle assembly, said stud assembly including a conical head shouldered screw, a conical head generally cylindrical grommet member axially bored for acceptance of said screw, said grommet being provided internally with shoulder means, the shoulder of said screw being axially and radially deformed to cooperate with the internal shoulder means of the grommet to provide an axially captive rotatable screw, the periphery of the grommet at its free end opposite the conical head portion being provided with a frusto-conical undercut which stops short of said free end to provide a shoulder means, two axially extending slots on opposite sides of the exterior surface of said grommet, each of said slots being provided with a radially increased depth adjacent the free end of the grommet whereby a fulcrum point is established intermediate the ends of the slots, an annular groove in the free end of said grommet and communicating with each of said slots, a U-shaped spring member seated in said groove having arms extending from its free ends and positioned within said slots, an expansible split ring member encircling said grommet and being capable of axial movement along said grommet between the shoulder means and the head means, said receptacle assembly including cup means having laterally extending flanges adjacent its end, said flanges being provided with suitable means to fasten the receptacle to a work panel, a nut element seated within said cup means, said cup means having means for accepting said nut element in non-rotative relationship, said nut element being generally tubular in shape and axially split throughout its length, said nut element having an integral annular flange extending laterally adjacent its lower end, said nut means further having a frusto-conical section with the greatest diameter of said section blending into said flange means, the remainder or upper section of said nut means being generally cylindrical in configuration and having its upper free end provided with an annular taper, a continuous annular ring frusto-conical in shape and complementary to the frusto-conical surface of said nut means, said ring having at its larger extremity a radially extending annular flange, a retaining means substantially cup-shaped and complementary in shape to the interior of the receptacle cup means, but shorter in axial extent than said cup means, the bottom of said retaining means having an aperture which will accept the frusto-conical portion of said ring and cylindrical portion of said nut means when the nut means, the ring and the retaining means are all axially telescoped within the receptacle cup section, said nut means and ring being axially shiftable between the bottom of said receptacle cup and the underside of said retaining means whereby when said nut means and ring are axially shifted towards said retaining means the flange of the ring bears on the retaining means and the internal frusto-conical surface of the ring will move axially down the frusto-conical portion of said nut thereby radially collapsing said nut means; said grommet being provided with an internal counterbore opposite the conical head of such size that it will accept the cylindrical portion of the nut means when the screw is telescoped into said nut means, whereby as said stud assembly is axially moved relative to said receptacle assembly as the screw means is rotated within said nut means, further, tightening of the screw means draws the nut means upwardly relative to the receptacle cup and radially collapses the nut means within the ring thereby gripping the screw and creating a prevailing, torque locking effect.

2. A stud assembly for mounting in an apertured panel member comprising a shouldered conical head screw having suitable driving means in its head, a substantially cylindrical grommet means having a frusto-conical head and an axially extending bore which is countersunk at the head end of said grommet, said bore being radially relieved adjacent said countersunk portion to provide a shoulder, the shoulder on said screw being axially and radially upset to axially capture said screw in rotative relationship to said grommet, a frusto-conically relieved section intermediate the head and opposite entering end of said grommet which provides external peripheral shoulder means adjacent said entering end, a plurality of circumferentially spaced axially extending slots in the exterior surface of said grommet intersecting said frusto-conically relieved portion and extending axially therebeyond in either direction, said slot being of greater radial depth adjacent the entering end of said grommet forming a fulcrum point intermediate the axial extent of said slots, an annular groove in the entering end wall of said grommet communicating with said slots, a U-shaped spring member seated in said groove having a plurality of arms projecting from the spring member which are initially perpendicular to the plane of said member and are accommodated in said slots, said arms in applied position are sprung radially outwardly by said fulcrum point so as to extend out of said slots beyond the radial limits of said grommet, a split resilient ring member embracing said grommet and adapted for axial movement between the base of the frusto-conical section and the head section of said grommet whereby said split ring member will captivate said grommet within an aperture in a workpiece and will react on the axially and radially extending arms of said spring member to radially distend them so as to retain the grommet in elevated position relative to said panel member.

3. A high shear fastening device for a pair of apertured workpieces including a stud assembly and a receptacle assembly, said stud assembly comprising a stud member and a grommet, said stud member being a conical head shoulder screw, said grommet being internally complimentary in shape at one end thereof to said conical head of the screw and having an external frusto-conical shape at said end, a bore extending axially through said grommet, a counterbore within said grommet adjacent said frusto-conical end, the shoulder on said screw being axially and radially upset to extend into said counterbore whereby said screw is axially retained but rotatably relative to said grommet, said screw being radially spaced from the inner walls of said grommet along a portion of the axial extent of said shank, said grommet being externally radially relieved adjacent the end opposite to said head so as to provide an annular shoulder, a plurality of axially extending slots which open outwardly at circumferentially spaced positions on said grommet, an annular groove in said opposite end of said grommet, said slots communicating with said groove and having substantially uniform depth through a major portion of their length and an increased depth adjacent said groove, a fulcrum point at the juncture of said uniform depth and said increase depth, a wire retainer member having a semi-circular base portion and a plurality of arms, each arm extending from the base portion substantially normal to the plane in which said base exists, said retainer member having its base portion retained within said groove and each of its arms positioned within one of said slots, a split resilient ring member embracing the grommet and axially movable between said annular shoulder and said frusto-conical end, said receptacle assembly comprising a hollow receptacle having means for non-rotatable attachment to one of said workpieces, a tubular fastening means non-rotably associated with said receptacle and extending axially within said receptacle in spaced relation to the inner wall of said receptacle, said fastening means being adapted for telescopic association with said stud and within said grommet.

4. A grommet assembly carrying screw threaded means for mounting in an apertured panel member, said grommet including a shank with a laterally extending head at one end and an axially extending bore therethrough adapted to accept said screw threaded means, a relieved portion on the shank outer periphery intermediate the head and opposite entering end of said grommet which provides external shoulder means adjacent said entering end, a plurality of spring means secured to said grommet extending axially along and normally sprung radially outwardly of the outer periphery of said grommet shank, means for securing said spring means to said grommet, a split resilient ring member embracing said grommet assembly, said ring having an inner dimension normally less than the maximum corresponding dimension of the head, shank and shoulder portions of said grommet and coacting means on said ring and grommet to effect expansion of said ring and permit axial movement of said ring between said shoulder means and the head portion of said grommet whereby said split ring member will captivate said grommet for limited axial movement in an aperture in a panel member and is further adapted for cooperation with said spring means to retain the grommet in elevated position relative to said panel member.

5. A stud assembly for mounting in an apertured panel member comprising a screw having a shank and a head with suitable driving means in said head, a grommet means having a shank with a laterally extending head at one end and an axially extending bore therethrough which is countersunk at the head end of said grommet for the purpose of accepting said screw head, said bore being radially relieved at a location adjacent to but axially spaced from said countersunk portion to provide a shoulder, means acting in cooperation with said screw and said shoulder to axially capture said screw in rotative relationship to said grommet, a relieved portion on the grommet shank outer periphery intermediate the head and opposite entering end of said grommet which provides external shoulder means adjacent said entering end, a plurality of spring means secured at at least one point to said grommet and extending axially along and normally sprung radially outwardly of the outer periphery of said grommet, a split resilient ring member embracing said grommet, said ring having an inner diameter normally less than the maximum corresponding dimension of the head, shank, and shoulder portions of said grommet, and coacting means on said ring and grommet to effect expansion of said ring and permit axial movement of said ring between said shoulder means and the head section of said grommet whereby said split ring member will captivate said grommet within axial limits in an aperture in a panel member and reacts in cooperation with said spring means so as to retain the grommet in elevated position relative to said panel member.

References Cited in the file of this patent

UNITED STATES PATENTS

| | | |
|---|---|---|
| 255,428 | Graham | Mar. 28, 1882 |
| 332,715 | Hoyt | Dec. 22, 1885 |
| 1,570,148 | Herr | Jan. 19, 1926 |
| 2,048,298 | Searles | July 31, 1936 |
| 2,433,138 | Marcell | Dec. 23, 1947 |
| 2,633,175 | Desbrueres | Mar. 31, 1953 |
| 2,949,143 | Shur | Aug. 16, 1960 |
| 2,972,367 | Wootton | Feb. 21, 1961 |

FOREIGN PATENTS

| | | |
|---|---|---|
| 124,396 | Switzerland | Feb. 1, 1928 |
| 604,017 | Great Britain | June 28, 1948 |